(12) United States Patent
Wen et al.

(10) Patent No.: US 6,989,416 B2
(45) Date of Patent: Jan. 24, 2006

(54) METHACRYLATE STRUCTURAL ADHESIVE

(75) Inventors: Weijian Wen, Novi, MI (US); Shahid Ghazi, Farmington Hills, MI (US); Jane Zhang, Troy, MI (US)

(73) Assignee: Sika Technology AG, Barr (CH)

( * ) Notice: Subject to any disclaimer, the term of this patent is extended or adjusted under 35 U.S.C. 154(b) by 213 days.

(21) Appl. No.: 10/140,554

(22) Filed: May 7, 2002

(65) Prior Publication Data

US 2003/0212212 A1    Nov. 13, 2003

(51) Int. Cl.
*C08L 9/00* (2006.01)
*C08L 21/00* (2006.01)

(52) U.S. Cl. .................. 524/451; 525/191; 525/194; 525/233

(58) Field of Classification Search ............... 525/191, 525/194, 233, 98, 99; 524/451
See application file for complete search history.

(56) References Cited

U.S. PATENT DOCUMENTS

| | | | |
|---|---|---|---|
| 4,126,504 A | 11/1978 | Wolinski et al. | |
| 4,223,115 A | 9/1980 | Zalucha et al. | |
| 4,293,665 A | 10/1981 | Zalucha et al. | |
| 4,467,071 A | 8/1984 | Dawdy | |
| 4,600,738 A | 7/1986 | Lamm et al. | |
| 4,624,725 A | 11/1986 | Lamm et al. | |
| 4,942,201 A | 7/1990 | Briggs et al. | |
| 5,034,300 A * | 7/1991 | Anno et al. | 430/120 |
| 5,112,691 A | 5/1992 | Briggs et al. | |
| 5,206,288 A | 4/1993 | Gosiewski et al. | |
| 5,865,936 A | 2/1999 | Edelman et al. | |
| 6,004,425 A | 12/1999 | Born et al. | |
| 6,291,593 B1 | 9/2001 | Cheng | |
| 6,602,958 B2 * | 8/2003 | Briggs et al. | 525/192 |
| 6,730,411 B1 * | 5/2004 | Doe et al. | 428/500 |

FOREIGN PATENT DOCUMENTS

| | | |
|---|---|---|
| EP | 0540098 A1 | 5/1993 |
| JP | 06033020 A1 | 8/1994 |
| WO | WO92/20753 A1 | 11/1992 |
| WO | WO 98/33845 | 8/1998 |
| WO | WO99/64529 A1 | 12/1999 |

* cited by examiner

*Primary Examiner*—Jeffrey Mullis
(74) *Attorney, Agent, or Firm*—Rader, Fishman & Grauer PLLC

(57) ABSTRACT

Several compositions for use as structural adhesives are disclosed. The compositions include a monomer component and a catalyst component. In one aspect, the monomer component includes a first elastomeric material of a block copolymer of styrene and isoprene, a second elastomeric material of a block copolymer of styrene and butadiene, and a cross-linked rubber of a copolymer of acrylonitrile and butadiene. In a second aspect, the monomer component includes a first elastomeric material of a block copolymer of styrene and butadiene, and a cross-linked rubber of a copolymer of acrylonitrile and butadiene. In another aspect, isophthalic acid is utilized as a polymerizable acid monomer in combination with a phosphate ester. In another aspect, the monomer component includes a cohesive failure mode promoter of rosin esters or of talc.

16 Claims, No Drawings

METHACRYLATE STRUCTURAL ADHESIVE

FIELD OF THE INVENTION

This invention relates to methacrylate structural adhesives and to methods of using such adhesives.

BACKGROUND OF THE INVENTION

Structural adhesives are well-known for bonding metal to metal, metal to plastic and plastic to plastic. Structural adhesives are attractive alternatives to mechanical joining methods, such as riveting or spot welding, because structural adhesives distribute load stresses over larger areas rather than concentrating such stresses at a few points. Use of structural adhesives can reduce or eliminate finishing costs because fasteners need not be hidden to produce an aesthetically pleasing appearance. Structural adhesives also produce cleaner and quieter products because they can seal out water, dust and noise. Additionally, they can be used to bond a diversity of materials without extensive surface preparation.

Despite their attractiveness, known structural adhesives have several potential drawbacks. While known structural adhesives have good high temperature performance and good durability, the bond they create is rigid. A rigid bond unevenly distributes stress within the bond, meaning that the stress at the edges of the of bond are higher then the stress in the middle of the bond. Thus, when two workpieces are bonded together at an overlap, increasing the overlap size does not significantly increase the bond strength. Furthermore, the uneven stress of rigid structural adhesives can lead to workpiece damage because adhesive will not fail but will remove paints and coating or in some cases break fiber reinforced plastics.

Additionally, structural adhesives which overcome the rigidity problem are known. These elastic adhesives evenly distribute stress within the bond. The result of this phenomenon is that loads are efficiently absorbed and distributed. However, known flexible structural adhesives have unacceptably poor high temperature performance and poor durability.

Consequently, the inventors have recognized the need for a structural adhesive which has excellent flexibility, good high temperature performance, and good durability, while also being useable without significant surface preparation. The inventors have also recognized the need for a structural adhesive which causes little damage to painted or coated workpieces.

SUMMARY OF THE INVENTION

The present invention relates to several compositions for use as structural adhesives. The compositions include a monomer component and a catalyst component. In one aspect, the monomer component includes a first elastomeric material of a block copolymer of styrene and isoprene, a second elastomeric material of a block copolymer of styrene and butadiene, and a cross-linked rubber of a copolymer of acrylonitrile and butadiene. In a second aspect, the monomer component includes a first elastomeric material of a block copolymer of styrene and butadiene, and a cross-linked rubber of a copolymer of acrylonitrile and butadiene. Isophthalic acid is utilized as a polymerizable acid monomer in combination with a phosphate ester. The monomer component includes a cohesive failure mode promoter of rosin esters or of talc.

DETAILED DESCRIPTION

The disclosed structural adhesive compositions comprise at least two components. The first or monomer component of the composition may have several sub-components including a methacrylate ester monomer, additional monomers and at least one elastomeric material. The monomer component may also include, inter alia, adhesion promoters, cross-linked rubbers, tertiary amine initiators, inhibitors, open-time promoters, thixotropic agents, antioxidants, plasticizers, talc and cohesive failure mode promoters. The second or catalyst component of the composition includes a polymerization catalyst.

The methacrylate ester monomers include those where the alcohol portion of the ester group contains one to eight carbon atoms. Examples of such ester monomers are methyl methacrylate (MMA), ethyl methacrylate, 2-ethyhexyl methacrylate, cyclo-10 hexyl methacrylate and mixtures thereof. The preferred ester monomer is MMA.

Additional monomers which may be used in combination with the methacrylate ester monomers are acrylate esters wherein the alcohol portion of the ester contains one to eight carbon atoms, examples of which are methyl acrylate, ethyl acrylate, butyl acrylate and 2-ethyhexyl acrylate. Other useful monomers are acrylonitrile, methacrylonitrile, styrene, vinyl toluene, and the like.

Other additional monomers which may be used in combination with the methacrylate ester monomers are polymerizable ethylenically unsaturated mono or polycarboxylic acids. Acrylic acid, methacrylic acid (MAA), isophthalic acid (EPA), crotonic acid, maleic acid and fumaric acid are examples of such acids. The preferred acids are MAA or IPA.

The at least one elastomeric material may be selected from block copolymers of styrene and isoprene or butadiene, which contains between about 10 wt % and 50 wt % styrene. For example, suitable block copolymers of styrene and isoprene include those with a styrene content of about 10–20 wt %, with a styrene content of about 17 wt % preferred. One such block copolymer is Kraton™ D-1117 from Shell Oil. Suitable block copolymers of styrene and butadiene include those with a styrene content of about 10–50 wt %. One preferred butadiene and styrene copolymer has a styrene content of about 18 wt %, while another has a styrene content of about 44–45 wt %. Exemplary preferred block copolymers include Kraton™ D-KX-222C from Shell Oil and Stereon™ 840 and 857A from Firestone Polymers. Additional useful elastomeric materials include polychloroprene and nitrile rubber (copolymers of acrylonitrile and butadiene).

The adhesion promoter increases the ability of the composition to adhere to galvanized steel. While known adhesion promoters may be utilized, it is preferred that a phosphate ester is utilized because elasticity is not sacrificed to increase adhesion. The phosphate ester is preferably selected so that it corresponds to the methacrylate ester monomer. One preferred adhesion promoter is mono methacrylate phosphate ester, available as CD 9050 from Sartomer of Exton, Pa.

The cross-linked rubber increases the impact resistance and the flexibility of the composition and is preferably selected to be easily soluble in the other sub-components of the monomer component. Preferably the cross-linked rubber has a median particle size of less than 0.5 mm. One suitable cross-linked rubber would be nitrile rubber (copolymers of acrylonitrile and butadiene). For example, suitable nitrile rubbers include those with acrylonitrile contents of about 30–35 wt %, with an acrylonitrile content of about 33 wt % being preferred. One exemplary nitrile rubber would be Zealloy™ 1422 from Zeon Chemicals. Another suitable cross-linked rubber may be an acrylate terpolymer such as those in the Sunigum™ line produced by Goodyear Chemical.

The tertiary amine initiator helps accelerate the reaction of the methacrylate ester monomers with the polymerization catalyst and is selected from N,N-dimethylaniline, N,N-dimethyltoluidine (DMT), N,N-diethylaniline, N,N-diethyltoluidine, N,N-bis[dihydroxyethyl]-p-toluidine, N,N-bis[dihydroxypropyl]-p-toluidine and the like.

The inhibitor increases the shelf like of the composition. Known inhibitors may be utilized, but benzoquinones are preferred, with naphthoquinone most preferred. The open time promoter, as the name suggests, increase the length of the time the adhesive remains 'skin' free. Suitable open time promoters include a variety of waxes, with a paraffin wax, such as IGI 1977 from the International Group preferred. The thixotropic agent may be utilized to increase the viscosity of the monomer component and thus prevent the adhesive from dripping or sagging in vertical applications. Suitable thixotropic agents are known to one skilled in the art and include polyamide thixotropes with Disparlon 6100 from King Industries being preferred. Suitable antioxidants are known to one skilled in the industry with the preferred antioxidant being 2,6-ditertbutyl-p-cresol also known as Ionol. The plasticizer may be utilized to decrease the viscosity of the monomer component. Known plasticizers may be used, with diisodecyl adipate (DIDA) the preferred plasticizer.

The monomer component may also include a cohesive failure mode promoter. When a structural adhesive fails, it is desirable for the adhesive to remain on both resultant workpieces. This is called a cohesive failure mode. Exemplary cohesive failure mode promoters include any rosin ester, such as tall oils, gum rosin with wood rosins being the preferred type of rosin ester. Talc may also be utilized as a cohesive failure mode promoter. Suitable talcs are selected based on cost. A variety of rosin esters and/or talcs may be used in combination or alone as a cohesive failure mode promoter.

The monomer component may be made according to the follow procedure or according to procedures known to one skilled in the art. A solution of each elastomer material and the methacrylate ester monomer is preferably prepared. Likewise, if the cohesive failure mode promoter, the antioxidant or the inhibitor are to be used, then solutions in the methacrylate ester monomer are prepared. In addition, solution of the open time promoter in xylene is prepared. Other components may be added neat.

While any order may be utilized for the addition of sub-components of the monomer component, the preferred order is as follows. To the elastomer solution(s), the cohesive failure mode promoter solution is added, if present. Then the remaining neat methacrylate ester monomer is added, followed by the plasticizer, the adhesion promoter, the open time promoter, the antioxidant, the inhibitor, the additional monomers, and the tertiary amine initiator. All sub-components are not necessarily included in each monomer component. The included sub-components are mixed. Next, the talc, and the cross-linked rubber are added while slowly increasing the mixing speed. Next, the thixotropic agent is added and the mixing is continued. The mixing machine is stopped and the mixture is allowed to sit. To insure that the thixotropic agent is properly activated and to insure that the cross-linked rubber is fully swelled, the mixture may be mixed and allowed to sit repeatedly. After it is allowed to sit, the mixture is mixed to create a uniform consistency. Finally, the mixture is mixed under a vacuum to remove any entrapped air. Generally, the amount of the methacrylate ester monomer may be increased to compensate for losses attributed to the application of the vacuum.

One aspect of the monomer component that has improved lap shear retention at high temperature has the sub-components listed in Table 1:

| Sub-Component | Suitable | Preferred |
| --- | --- | --- |
| Elastomer Material 1 | 15–35 wt % | 20–30 wt % |
| Elastomer Material 2 | 1–20 wt % | 4–15 wt % |
| Methacrylate ester monomer | 50–70 wt % | 54–61 wt % |
| Polymerizable acid monomer | up to 10 wt % | 2–5 wt % |
| Cross-linked rubber | up to 15 wt % | 2–10 wt % |
| Tertiary amine inhibitor | up to 5 wt % | 0.5–2 wt % |
| Inhibitor | up to 2 wt % | <0.1 wt % |
| Open time promoter | up to 5 wt % | 1–3 wt % |

Another aspect of the monomer component has improved adhesion to galvanized steel and aluminum while also maintaining good flexibility has the sub-components listed in Table 2:

| Sub-Component | Suitable | Preferred |
| --- | --- | --- |
| Elastomer Material | 15–35 wt % | 20–30 wt % |
| Methacrylate ester monomer | 50–70 wt % | 50–65 wt % |
| Polymerizable acid monomer | up to 10 wt % | 1–5 wt % |
| Cross-linked rubber | up to 20 wt % | 2–10 wt % |
| Thixotropic agent | up to 6 wt % | 1–4 wt % |
| Tertiary amine initiator | up to 3 wt % | 0.1–1.5 wt % |
| Inhibitor | up to 1 wt % | <0.02 wt % |
| Open time promoter | up to 5 wt % | 1–4 wt % |

A third aspect of the monomer component has improved elastic recovery while also having a generally cohesive failure mode has the sub-components listed in Table 3:

| Sub-Component | Suitable | Preferred |
| --- | --- | --- |
| Elastomer Material 1 | 10–30 wt % | 15–23- wt % |
| Elastomer Material 1 | 5–20 wt % | 9–15 wt % |
| Methacrylate ester monomer | 40–65 wt % | 45–60 wt % |
| Polymerizable acid monomer | up to 10 wt % | 1–5 wt % |
| Phosphate ester | up to 10 wt % | 1–5 wt % |
| Cross-linked rubber | 2–15 wt % | 5–10 wt % |
| Tertiary amine initiator | up to 5 wt % | 0.5–3 wt % |
| Open time promoter | up to 5 wt % | 1–3 wt % |
| Thixotropic agent | up to 10 wt % | 1–5 wt % |
| Inhibitor | up to 2 wt % | <1 wt % |

A fourth aspect of the monomer component has improved elastic recovery has the sub-components listed in Table 4:

| Sub-Component | Suitable | Preferred |
| --- | --- | --- |
| Elastomer Material 1 | 15–35 wt % | 20–30 wt % |
| Methacrylate ester monomer | 45–65 wt % | 50–60 wt % |
| Polymerizable acid monomer | up to 10 wt % | 1–5 wt % |
| Phosphate ester | up to 10 wt % | 1–5 wt % |
| Cross-linked rubber | 2–15 wt % | 1–10 wt % |
| Tertiary amine initiator | up to 5 wt % | 0.5–3 wt % |

-continued

| Sub-Component | Suitable | Preferred |
| --- | --- | --- |
| Open time promoter | up to 5 wt % | 1–3 wt % |
| Thixotropic agent | up to 10 wt % | 1–5 wt % |
| Cohesive failure mode promoter | up to 20 wt % | 1–10 wt % |
| Plasticizer | up to 10 wt % | 1–5 wt % |
| Antioxidant | up to 5 wt % | 0.01–0.5 wt % |
| Inhibitor | up to 2 wt % | <1 wt % |

Another aspect of the monomer component has the sub-components listed in Table 5:

| Sub-Component | Suitable | Preferred |
| --- | --- | --- |
| Elastomer Material 1 | 10–25 wt % | 12–22 wt % |
| Elastomer Material 2 | 1–10 wt % | 2–6 wt % |
| Methacrylate ester monomer | 50–70 wt % | 55–65 wt % |
| Polymerizable acid monomer | up to 10 wt % | 1–5 wt % |
| Phosphate ester | up to 10 wt % | 1–5 wt % |
| Cross-linked rubber powder | 2–15 wt % | 1–10 wt % |
| Tertiary amine initiator | up to 5 wt % | 0.5–3 wt % |
| Open time promoter | up to 5 wt % | 1–3 wt % |
| Thixotropic agent | up to 10 wt % | 1–5 wt % |
| Cohesive failure mode promoter | up to 20 wt % | 1–10 wt % |
| Inhibitor | up to 2 wt % | <1 wt % |

The catalyst component of the composition is a polymerization catalyst. Suitable catalysts include free radical generators which trigger the polymerization of the monomer component. Such catalysts are peroxides, hydroperoxides, peresters, and peracids. Examples of these catalysts are benzoyl peroxide, cumene hydroperoxide, tertiary butyl hydroperoxide, dicumyl peroxide, tertiary butyl peroxide acetate, tertiary butyl perbenzoate, ditertiary butyl azodiisobutyronitrile and the like. Radiant energy, e.g., ultraviolet light, and heat, may also be used as a catalyst. The preferred catalyst is a paste of 18 wt % anhydrous benzoyl peroxide.

In use, the two components of the inventive composition are combined and then applied to the workpieces to be joined. Alternately, the two components may be applied separately to the workpieces to be joined where the joining of the workpieces serves to combine the two components. Where radiant energy is used as the second component, the radiant energy may be applied to the first component either before or after the first component is applied to the workpiece.

Typically, the ratio of the monomer component to the catalyst component of the composition may range from 30:1 and to about 1:1. More preferably, the ratio is between 15:1 and 5:1. Most preferably, the ratio of the monomer component to catalyst component is 10:1.

EXAMPLES

The following compositions were prepared and tested. Test samples of the monomer component were prepared as described above, where the wt % refers to the composition of the monomer component. For all test samples, the catalyst component was a 18% benzoyl peroxide paste. A ratio of 10:1 (monomer component: catalyst component) was utilized in order allow for comparison among the test samples.

To use the structural adhesive, the monomer component is combined with the catalyst component and applied to the workpieces which were then bonded together. The tensile strength, the elongation and the modulus of the resultant compositions were measured according to procedures set forth in ASTM D638-95, while the lap shear strength was measured according to ASTM D1002-94. The elastic recovery of a composition was calculated by creating a strength versus stress curve based on the modulus of the composition. The linear portion of the curve corresponds to the elastic recovery of the composition.

Example 1

| Sub-Component | Wt % |
| --- | --- |
| Kraton D-1117 | 25 |
| Stereon 840 | 9 |
| MMA | 54 |
| MAA | 3 |
| Zealloy 1422 | 6 |
| DMT | 1.2 |
| Naphthoquinone | 0.01 |
| IGI 1977 | 2 |

A 35% solution of Kraton D-1117 in MMA is prepared as is a 35% solution of Stereon 840 in MMA and a 1% solution of naphthoquinone in MMA. Additionally, a 10% solution of IGI 1977 in xylene is prepared.

To the Kraton D-1117 solution, the Stereon 840 solution is added, followed by the remaining MMA. Next, in order, is added the IGI 1977 solution, the naphthoquinone solution, the MAA, and the DMT. These sub-components are mixed at about 800 rpm for 10 min. Next, the Zealloy 1422 is added while slowly increasing the mixing speed to about 900 rpm, where the speed is held for about 15 minutes. The mixture is allowed to sit for at least three hours, after which, the mixture is mixed at about 1200 rpm for 20 minutes to create a uniform consistency. Next the mixture is mixed at about 50 rpm while a vacuum is applied to remove any entrapped air from the mixture.

Test Results for Example 1

| | |
| --- | --- |
| Tensile Strength | 1060 psi |
| Elongation | 180–230% |
| Modulus | 5600 psi |
| Lap Shear on Duraplate ™ @ 72° F. | 700 psi |
| Lap Shear on Duraplate ™ @ 180° F. | 75 psi |
| Elastic Recovery | 10% |

Duraplate™, available from Wabash National, has a plastic core material sandwiched between two layers of steel. Duraplate™ and similar materials are commonly used in vehicle manufacturing.

Example 2

| Sub-Component | Wt % |
| --- | --- |
| Kraton D-KX-222C | 26.5 |
| MMA | 58.6 |
| MAA | 3 |
| Zealloy 1422 | 6 |
| Disparlon 6100 | 2.8 |

-continued

| Sub-Component | Wt % |
|---|---|
| DMT | 0.7 |
| Naphthoquinone | 0.01 |
| IGI 1977 | 2.8 |

A 1% solution of naphthoquinone in MMA is prepared, as is a 10% solution of IGI 1977 in xylene was prepared. A solution of Kraton D-KX-222C in MMA is prepared, to which is added, in order, the IGI 1977 solution, the naphthoquinone solution, the MAA, and the DMT. These sub-components are mixed at about 800 rpm for 10 min. Next, the Zealloy 1422 is added while slowly increasing the mixing speed to about 900 rpm, where the speed is held for about 15 minutes. Next, the Disparlon 6100 is added and mixed for an additional 15 minutes at 900 rpm. The mixture is allowed to sit for at least three hours, after which, the mixture is mixed at about 1200 rpm for 20 minutes to create a uniform consistency. Next the mixture is mixed at about 50 rpm while a vacuum is applied to remove any entrapped air from the mixture.

Test Results for Example 2

| Tensile strength | 1550 psi |
|---|---|
| Elongation | 86% |
| Modulus | 21000 psi |
| Lap Shear on Duraplate ™ @ 72° F. | 1240 psi |
| Lap Shear on Duraplate ™ @ 180° F. | 590 psi |
| Elastic Recovery | 5% |

Example 3

| Sub-Component | Wt % |
|---|---|
| Kraton D-1117 | 19 |
| Stereon 840 | 12 |
| MMA | 52 |
| IPA | 2 |
| CD 9050 | 3 |
| Zealloy 1422 | 7 |
| DMT | 1.2 |
| IGI 1977 | 1.5 |
| Disparlon 6100 | 2 |
| Naphthoquinone | 0.01 |

A 35% solution of Kraton D-1117 in MMA is prepared as is a 35% solution of Stereon 840 in MMA and a 1% solution of naphthoquinone in MMA. Additionally, a 10% solution of IGI 1977 in xylene is prepared.

To the Kraton D-1117 solution, the Stereon 840 solution is added, followed by the remaining MMA. Next, in order, is added the CD 9050, the IGI 1977 solution, the naphthoquinone solution, the IPA, and the DMT. These sub-components are mixed at about 800 rpm for 10 min. Next, the Zealloy 1422 is added while slowly increasing the mixing speed to about 900 rpm, where the speed is held for about 15 minutes. Next, the Disparlon 6100 is added and mixed for an additional 15 minutes at 900 rpm. The mixture is allowed to sit for at least three hours, after which, the mixture was mixed at about 1200 rpm for 20 minutes to create a uniform consistency. Next the mixture is mixed at about 50 rpm while a vacuum is applied to remove any entrapped air from the mixture.

Test Results for Example 3

| Tensile Strength | 1120 psi |
|---|---|
| Elongation | 120% |
| Modulus | 7700 psi |
| Lap Shear on galvanized steel @ 72° F. | 1400 psi |
| Lap Shear on aluminum @ 170° F. | 1460 psi |
| Lap Shear on galvanized steel @ 170° F. | 180 psi |
| Lap Shear on aluminum @ 170° F. | 180 psi |
| Elastic Recovery | 5% |

Example 4

| Sub-Component | Wt % |
|---|---|
| Kraton D-KX-222C | 26 |
| MMA | 54 |
| IPA | 2 |
| CD 9050 | 3 |
| Zealloy 1422 | 4 |
| DMT | 1 |
| IGI 1977 | 2 |
| Disparlon 6100 | 1 |
| Sylvaros PR R-85 | 2 |
| Talc | 2 |
| DIDA | 2 |
| Ionol | 0.1 |
| Naphthoquinone | 0.01 |

A 35% solution of Kraton D-KX-222C in MMA was prepared as were a 40% solution of Sylvaros PR R-85 in MMA, a 40% solution of Ionol in MMA, and a 1% solution of naphthoquinone in MMA. Additionally, a 10% solution of IGI 1977 in xylene was prepared.

To the Kraton D-KX-222C solution, the Sylvaros PR R-85 solution was added, followed by the remaining MMA. Next, in order, was added the DIDA, the CD 9050, IGI 1977 solution, the Ionol solution, the naphthoquinone solution, the IPA, and the DMT. These sub-components were mixed at about 800 rpm for 10 min. Next, the talc and the Zealloy 1422 were added while slowly increasing the mixing speed to about 900 rpm, where the speed was held for about 15 minutes. Next, the Disparlon 6100 was added and mixed for an additional 15 minutes at 900 rpm. The mixture was allowed to sit for at least three hours, after which, mixture was mixed at about 1200 rpm for 20 minutes to create a uniform consistency. Next the mixture was mixed at about 50 rpm while a vacuum was applied to remove any entrapped air from the mixture.

Test Results for Example 4

| Tensile Strength | 1550 psi |
|---|---|
| Elongation | 81% |
| Modulus | 8800 psi |
| Lap Shear on galvanized steel @ 72° F. | 1400 psi |
| Lap Shear on aluminum @ 170° F. | 1630 psi |

-continued

| Sub-Component | |
|---|---|
| Lap Shear on galvanized steel @ 170° F. | 470 psi |
| Lap Shear on aluminum @ 170° F. | 401 psi |
| Elastic Recovery | 7% |

Example 5

| Sub-Component | Wt % |
|---|---|
| Neoprene | 17 |
| Nitrile rubber | 4 |
| MMA | 60 |
| IPA | 2 |
| CD 9050 | 3 |
| Zealloy 1422 | 5.5 |
| DMT | 1 |
| IGI 1977 | 2 |
| Disparlon 6100 | 2 |
| Sylvaros PR R-85 | 2.5 |
| Naphthoquinone | 0.01 |

A 35 % solution of neoprene in MMA is prepared as is a 35% solution of nitrile rubber in MMA, a 40% solution of Sylvaros PR R-85 in MMA and a 1% solution of naphthoquinone in MMA. Additionally, a 10% solution of IGI 1977 in xylene is prepared.

To the Neoprene solution, the nitrile rubber solution and the Sylvaros PR R-85 solution are added, followed by the remaining MMA. Next, in order, is added the CD 9050, the IGI 1977 solution, the naphthoquinone solution, the IPA, and the DMT. These sub-components are mixed at about 800 rpm for 10 min. Next, the Zealloy 1422 is added while slowly increasing the mixing speed to about 900 rpm, where the speed is held for about 15 minutes. Next, the Disparlon 6100 is added and mixed for an additional 15 minutes at 900 rpm. The mixture is allowed to sit for at least three hours, after which, the mixture was mixed at about 1200 rpm for 20 minutes to create a uniform consistency. Next the mixture is mixed at about 50 rpm while a vacuum is applied to remove any entrapped air from the mixture.

Test Results for Example 5

| | |
|---|---|
| Tensile Strength | 2070 psi |
| Elongation | 87% |
| Modulus | 41000 psi |
| Lap Shear on galvanized steel @ 72° F. | 2000 psi |
| Lap Shear on aluminum @ 72° F. | 1900 psi |
| Lap Shear on galvanized steel @ 170° F. | 700 psi |
| Lap Shear on aluminum @ 170° F. | 500 psi |
| Elastic Recovery | <2% |

While the invention has been specifically described in connection with certain specific embodiments and examples thereof, it is to be understood that this is by way of illustration and not of limitation, and the scope of the appended claims should be construed as broadly as the prior art will permit.

What is claimed is:

1. A composition for use as a structural adhesive, comprising:
   an elastomeric component comprising,
      a first elastomeric material,
      a second elastomeric material,
      a methacrylate ester monomer,
      an acid monomer,
      a phosphate ester,
      a cross-linked rubber,
      a tertiary amine initiator,
      an inhibitor, and
      a thixotropic agent; and
   a catalyst component,
   wherein the acid monomer is isophthalic acid.

2. A composition for use as a structural adhesive, comprising:
   an elastomeric component comprising,
      a first elastomeric material,
      a second elastomeric material,
      a methacrylate ester monomer,
      an acid monomer,
      a phosphate ester,
      a cross-linked rubber,
      a tertiary amine initiator,
      an inhibitor, and
      a thixotropic agent; and
   a catalyst component,
   wherein the elastomeric component comprises greater than 0 wt % up to 10 wt % of isophthalic acid.

3. The composition of claim 2 wherein the elastomeric component comprises:
   10–30 wt % of the first elastomeric material,
   5–20 wt % of the second elastomeric material,
   45–65 wt % of the methacrylate ester monomer,
   greater than 0 wt % up to 10 wt % of the phosphate ester,
   2–15 wt % of the cross-linked rubber,
   greater than 0 wt % up to 5 wt % of the tertiary amine initiator,
   greater than 0 wt % up to 2 wt % of the inhibitor, and
   greater than 0 wt % up to 10 wt % of the thixotropic agent.

4. A composition for use as a structural adhesive, comprising:
   an elastomeric component comprising.
      a first elastomeric material,
      a methacrylate ester monomer,
      an acid monomer,
      a phosphate ester,
      a cross-linked rubber,
      a tertiary amine initiator,
      an open nine promoter,
      a thixotropic agent,
      a cohesive failure mode promoter,
      a plasticizer,
      an antioxidant, and
      an inhibitor; and
   a catalyst component,
   wherein the cohesive failure mode promoter includes a rosin ester or a talc.

5. The composition of claim 4 wherein the acid monomer is isophthalic acid.

6. The composition of claim 4 wherein the elastomeric component comprises greater than 0 wt % up to 10 wt % of isophthalic acid.

7. The composition of claim 4 wherein the cohesive failure mode promoter is a combination of wood rosin and talc.

8. The composition of claim 7 wherein the elastomeric component comprises 0.01–20 wt % of the cohesive failure mode promoter.

9. The composition of claim 8 wherein the elastomeric component includes:
- 15–35 wt % of the first elastomeric material,
- 45–65 wt % of the methacrylate ester monomer,
- greater than 0 wt % up to 10 wt % of the phosphate ester,
- 2–15 wt % of the cross-linked rubber,
- greater than 0 wt % up to 5 wt % of the tertiary amine initiator,
- greater than 0 wt % up to 5 wt % of the open time promoter,
- greater than 0 wt % up to 10 wt % of the thixotropic agent,
- greater than 0 wt % up to 10 wt % of the plasticizer,
- greater than 0 wt % up to 5 wt % of the antioxidant, and
- greater than 0 wt % up to 2 wt % of the inhibitor.

10. A composition for use as a structural adhesive, comprising:
- an elastomeric component including
  - a first elastomeric material,
  - a second elastomeric material,
  - a methacrylate ester monomer,
  - an acid monomer,
  - a phosphate ester,
  - a cross-linked rubber,
  - a tertiary amine initiator,
  - an open time promoter,
  - a thixotropic agent,
  - a cohesive failure mode promoter, and
  - an inhibitor; and
- a catalyst component, wherein the cohesive failure mode promoter includes a rosin ester or a talc.

11. The composition of claim 10 wherein the acid monomer is isophthalic acid.

12. The composition of claim 10 wherein the elastomeric component comprises greater than 0 wt % up to 10 wt % of isophthalic acid.

13. The composition of claim 10 wherein the first elastomer material is a polychloroprene and the second elastomeric material is a copolymer of acrylonitrile and butadiene.

14. The composition of claim 10 wherein the cohesive failure mode promoter is a combination of wood rosin and a talc.

15. The composition of claim 14 wherein the elastomeric component comprises 0.01–20 wt % of cohesive failure mode promoter.

16. The composition of claim 15 wherein the elastomeric component includes:
- 10–25 wt % of the first elastomeric material,
- 1–10 wt % of the second elastomeric material,
- 50–70 wt % of the methacrylate ester monomer,
- greater than 0 wt% up to 10 wt % of the phosphate ester,
- 2–15 wt % of the cross-linked rubber,
- greater than 0 wt % up to 5 wt % of the tertiary amine initiator,
- greater than 0 wt % up to 5 wt % of the open time promoter,
- greater than 0 wt % up to 10 wt % of the thixotropic agent, and
- greater than 0 wt % up to 2 wt % of the inhibitor.

* * * * *

UNITED STATES PATENT AND TRADEMARK OFFICE
CERTIFICATE OF CORRECTION

PATENT NO.        : 6,989,416 B2
APPLICATION NO. : 10/140554
DATED             : January 24, 2006
INVENTOR(S)       : Weijian Wen et al.

It is certified that error appears in the above-identified patent and that said Letters Patent is hereby corrected as shown below:

In Claims:

Claim 4, column 10, line 51, change "nine" to -- time --

Signed and Sealed this

Twenty-second Day of May, 2007

JON W. DUDAS
*Director of the United States Patent and Trademark Office*